United States Patent [19]
Johnson

[11] 3,787,885
[45] Jan. 22, 1974

[54] TRANSPORTABLE STRIP CHART RECORDER

[75] Inventor: Jerry E. Johnson, Bellevue, Wash.

[73] Assignee: Ryan Instruments, Inc., Seattle, Wash.

[22] Filed: May 12, 1972

[21] Appl. No.: 252,929

[52] U.S. Cl.................. 346/136, 324/29.5, 346/145
[51] Int. Cl. ........................................... G01d 15/28
[58] Field of Search . 346/136, 145, 33 TP, 41, 116, 346/117; 73/343.5; 324/29.5

[56] References Cited
UNITED STATES PATENTS

| | | | |
|---|---|---|---|
| 2,142,492 | 1/1939 | Cannon............................. | 346/93 X |
| 2,578,803 | 12/1951 | Holmberg et al. .............. | 346/136 X |
| 2,640,099 | 5/1953 | Hull.................................. | 324/29.5 |
| 2,776,569 | 1/1957 | Biro................................... | 73/343.5 |
| 3,545,004 | 12/1970 | Alden ............................... | 346/145 X |
| 3,713,170 | 1/1973 | Kaufman............................ | 346/136 |

Primary Examiner—Joseph W. Hartary

[57] ABSTRACT

A readily transportable strip chart recorder includes a disposable strip chart dispenser. The dispenser holds one rolled end of the strip chart and the free end passes over a writing surface and beneath a window exposing the strip chart above the writing surface. The dispenser is detachably mounted in a case with the free end of the strip chart adjacent a drive spool to be wound thereon when in use. The drive spool is powered by a battery driven motor. Two switches are employed to close the circuit between the battery and the motor. One switch is closed when the dispenser is in place in the recorder case, whereas the second switch is closed only after the strip chart is manually advanced on the spool. Battery terminals are exposed externally of the case for checking the battery without opening the recorder case.

4 Claims, 6 Drawing Figures

PATENTED JAN 22 1974　3,787,885

TRANSPORTABLE STRIP CHART RECORDER

BACKGROUND OF THE INVENTION

1. Field of the Invention

This invention pertains to strip chart recorders, and particularly strip chart recorders of the type that are intended to be easily transportable for use in transit shipments of produce or the like.

2. Description of the Prior Art

Easily transportable strip chart recorders of the type to which this invention pertains are presently being utilized to record temperature or other environmental variables in shipments by rail, truck, air and boat. The purpose of these recorders is to measure the environmental variable, for example, temperature, from the beginning of a trip to its destination. This temperature recording assures the receipient of the shipment that the goods shipped were maintained at a desired safe temperature throughout the trip.

Strip chart recorders heretofore employed have utilized a manually wound spring as a source of power for driving the strip chart. As a result, the recorder has to be manually rewound each time it is received in the central depository. Prior art recorders also required time consuming threading of conventional charts onto the storage spool and a drive spool. Furthermore, in prior art recorders customers were not always able to obtain from the recording the information desired for several reasons: (1) The vehicle operator or shipping foreman who was responsible for starting the drive mechanism and filling in the desired written information at the beginning of the strip chart aften found the job too complicated or too time consuming and neglected the task, thus resulting in either an unused strip chart or one having incomplete information or both; (2) The person whose responsibility was to analyze information recorded at the destination of the shipment often took little care in removing the strip chart, resulting in a torn or otherwise damaged strip chart.

SUMMARY OF THE INVENTION

Hand winding of prior art strip charts is too costly and time consuming and it is thus an object of this invention to provide a battery powered strip chart recorder. Furthermore, since a shipper desires to maintain an inventory of such recorders, it is desirable to provide a battery circuit that will not be energized while the recorder is sitting idle awaiting use. It is also desirable that the battery circuit not remain energized at the end of the shipment after use. The practice in this field at present is to return the recorder to a central depository, such as the recorder manufacturer's facility, for replacement of the strip chart, and inspection and maintenance, prior to use on another shipment. In general, the strip chart recorders are transmitted between the depository and the shipper and the receiver and depository by mail and thus it is desirable that the strip chart recorder be lightweight to reduce postage cost.

It is thus another object of this invention to provide a battery powered strip chart recorder that has a battery circuit which is completed only when a strip chart is in place ready for use and has been advanced a predetermined distance by the operator.

It is another object of this invention to provide a strip chart recorder with an inexpensive expendable strip chart dispenser detachable from the recorder when not in use.

It is another object of this invention to provide a strip chart recorder that has a replaceable readily available writing surface to manually record data on the strip chart prior to its use.

Basically the objects are obtained by providing a strip chart having a case, means in the case for holding a strip chart, battery powered drive means for moving the strip chart, manual override means for advancing the strip chart, a smooth flat writing surface for entering data before the chart is advanced, switch means for completing the circuit to the battery only when the strip chart is ready for use, and a transducer and stylus for recording the environmental variable when the strip chart is in use. In the preferred form battery terminals are exposed externally of the case so that the battery may be checked without its removal from the case.

The invention also includes a strip chart dispenser comprising upper and lower portions that nest together to hold and confine the strip chart therebetween. One of the portions has a container for holding a rolled end of the strip chart with the other end free for wrapping around the spool of a strip chart recorder. The upper portion is provided with a window and the lower portion with a smooth writing surface. The dispenser is of inexpensive plastic material intended to be disposed of after use so that the pointed stylus of the strip chart recorder always has an unused writing surface with each new strip chart used.

DESCRIPTION OF THE PREFERRED EMBODIMENTS

Figure 1:
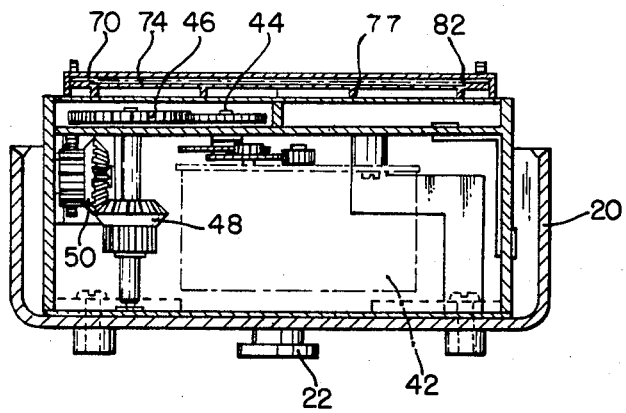
FIG. 1 is a transverse section taken along the line 1—1 of FIG. 2.

As best shown in FIG. 1, the portable strip chart recorder of this invention employs a case 10, a transducer 12 for sensing some environmental variable, such as pressure or temperature, primarily temperature in this application, a strip chart dispenser 14, a strip chart driving means 16 for advancing the strip chart, and a battery and battery circuit 18 for powering the drive means.

As is well understood in this art, the case 10 is relatively small, approximately 5 inches by 3 inches by 2 inches so that it is easily transportable by mail. The case is of tough shock resistant material and includes a base 20 having posts 21 for attaching the case to the wall of the vehicle. A cover or top 22 is hinged to the base 20. The transducer 12 is secured to the top and is provided with a pressure-scribing stylus 24 that engages a strip chart 26 when the top is closed onto the base. A latch mechanism 26 is provided with mating slots 26a and 26b to receive a wire or other sealing strip to lock the top to the base to assure maximum security against tampering.

The drive means 16 includes a drive spool 30 having a manually-driven wheel 32 and a gear 34 mounted on an axle 36. A spool core 38 is integrally secured to the wheel 32 and receives the strip chart in a well known manner, such as by hooking a tab of the strip chart over a catch mechanism 39 to secure it to the core for winding. Spring fasteners 40 bias the wheel and gear toward one another on the axle 36 so that they move through frictional engagement as an integral unit. The wheels 32 and 38, however, can be moved independently of the gear 34 by applying sufficient force to the wheel to overcome the frictional engagement of the spring washers. This arrangement provides a means for manually overriding the battery powered drive to advance the strip chart relative to the gear 34.

The gear 34 is driven through a drive train connected to a battery powered clock motor 42 of conventional construction. The clock motor has an output shaft which is keyed to a first drive gear 44 (FIG. 1). The first drive gear meshes with a second drive gear 46. As is readily apparent to one skilled in the art, the relative sizes of the drive gears 44 and 46 may be interchanged to provide various rates of movement of the strip chart. For example, the embodiment illustrated shows a 1:2 gear ratio to provide a 30-day strip chart movement. Other typical ratios are 1:1 and 2:1 to provide 15-day and 8-day strip chart recordings, respectively. The gear 46 is coupled via a shaft to a bevel gear 48 which in turn meshes with a second bevel gear 50. Bevel gear 50 meshes with a gear 51 that in turn meshes with the gear 34.

Figure 2:
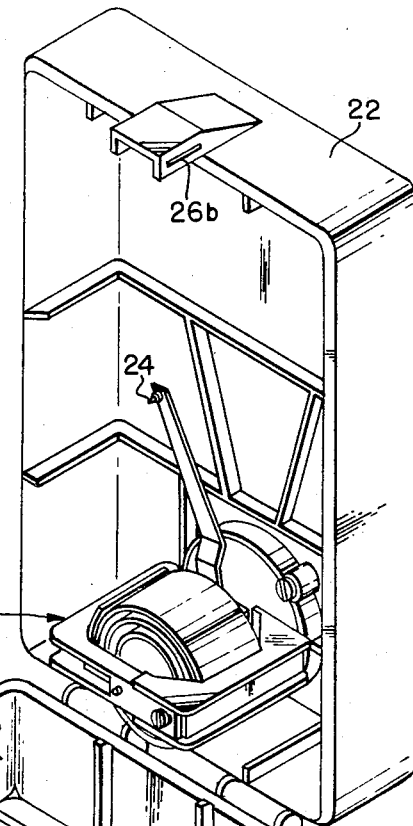
FIG. 2 is an isometric of a portable strip chart recorder embodying the principles of the invention.
Figure 2:
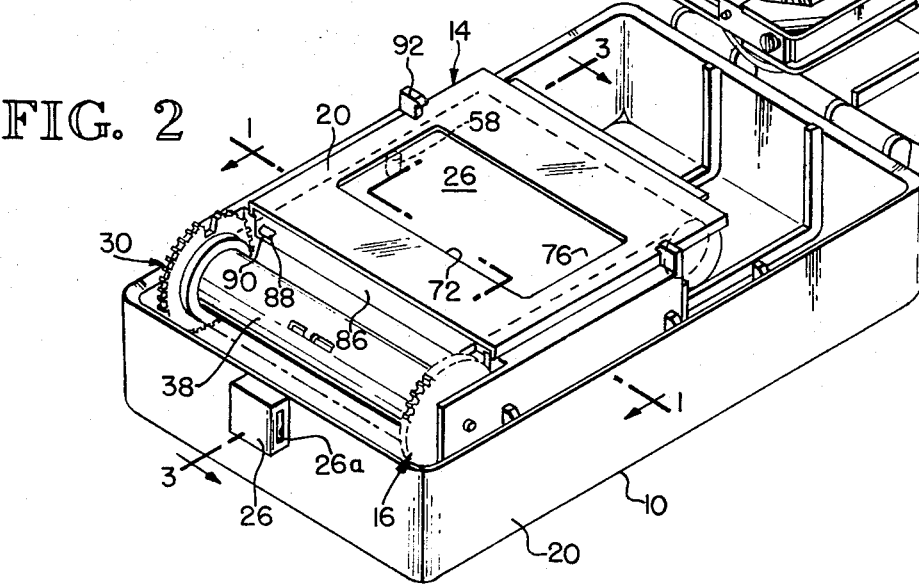

Since the strip chart recorder may sit idle both before and after shipment for many days, it is necessary that the battery be disconnected from the circuit except when actually in use in making a recording during a shipment. It is thus a unique feature of this invention to provide a circuit to assure conservation of the battery. For this purpose the circuit is provided with a first switch 52 and a second switch 54. The first switch 52 is normally spring-biased out of engagement with contactor 56 which forms part of the battery circuit. The switch is moved into contact with contactor 56 to partially complete the battery circuit by a pin 58 attached to the underside of the strip chart dispenser 14. The pin closes the switch 52 only when the strip chart dispenser is in place as shown in FIGS. 2 and 3, for example, and thus when the dispenser is removed from the case 10, the battery circuit is opened.

Figure 4:
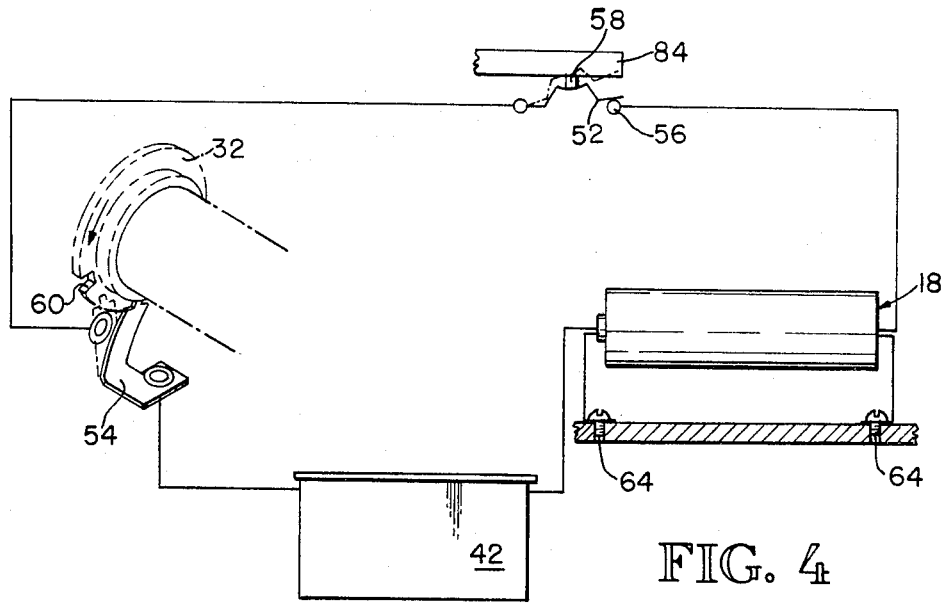
FIG. 4 is a schematic circuit diagram employed in the recorder of FIG. 2.
Figure 5:
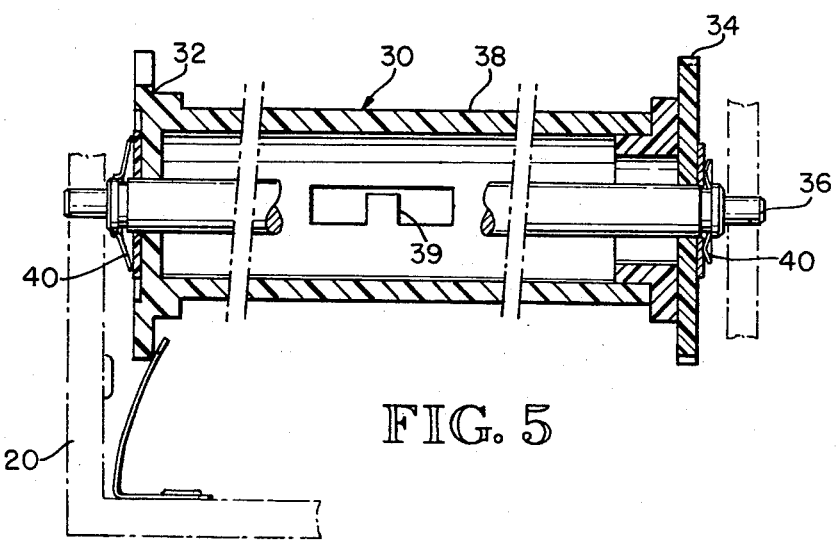
FIG. 5 is a section through the drive means 16.
Figure 6:
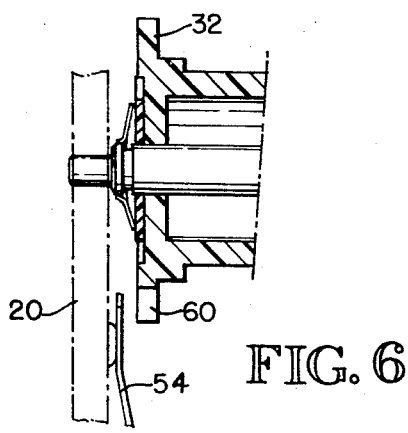
FIG. 6 is a fragmentary section similar to FIG. 5 showing a closed switch position.

The second step for completing the battery circuit occurs when the second switch 54 is also closed. For this purpose, wheel 32 is provided with a notch 60 large enough to allow the switch 54 to pass through. The switch 54 is biased to move to the left as shown in FIGS. 5 and 6 into the position shown in FIG. 6 which closes with a contact to complete the battery circuit. It is a unique feature of this invention that the second switch 54 is closed automatically by the advancing of the strip chart prior to its use. In the use of the strip chart recorder a shipper must enter on the strip chart certain data, such as date, time, shipper, contents, consignee, destination, etc. This information is invaluable to both the shipper and the receiver to assure that the contents of the shipment have been handled with due care and have not deteriorated during transit. The information is written in prescribed locations at the beginning of the strip chart. To enter this data the shipper must manually advance the strip chart and then write the information at the prescribed location. The advancement occurs by rotating the wheel 32 in the direction of the arrows shown in FIG. 4. As the strip chart is advanced the notch 60 on the wheel is also rotated into alignment with the switch 54. When the notch is aligned, the switch snaps through the notch 60 closing the battery circuit, thus energizing the drive motor 42. With the battery circuit completed the strip chart begins to advance at the desired speed setting.

When the shipment reaches its destination, the strip chart is removed and the recording with the data written in by the shipper is analyzed to assure that the shipment traveled at the desired temperature. To examine the strip chart the dispenser is freed from the case and the remaining strip chart stripped from the core 38. As the dispenser is lifted, the pin 58 is removed from engagement with the first switch 52, allowing the switch to open, thus de-energizing the battery circuit. The receiver then places the recorder, without the strip chart dispenser, into the mail for delivery back to a central depository. At the depository a new strip chart dispenser is placed into the case and threaded onto the core and the switch 54 is reset against the inside surface of the wheel 32.

Figure 3:
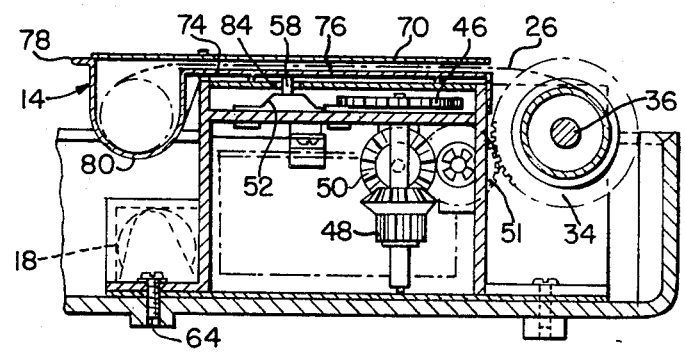
FIG. 3 is a section taken along the line 3—3 of FIG. 2.

Another unique feature of the invention is that the battery 18 has a pair of terminals connected to two set screws 64 which are exposed to the exterior of the case (as best shown in FIG. 3). This feature enables an inspector at the depository to examine the potential of the battery merely by placing voltmeter probes on the two terminals 64. As a result, removal of the battery is necessary only for replacement. Since thousands of recorders are handled in the depository, this saves considerable time.

Another unique feature of this invention is the use of a strip chart dispenser 14 that is inexpensive and expendable. The dispenser is also designed to facilitate removal of the strip chart after use and initial threading of the strip chart into the recorder. In practice it has been found that the foreman or clerk at the destination is often unfamiliar with the use of strip charts and if a substantial amount of winding or unthreading is required, the strip chart is often damaged, ruining the record. To overcome this problem the instant invention provides a foolproof means of removing the strip chart to assure its usefulness. For this purpose the dispenser 14 is provided with an upper portion 70 of lightweight inexpensive plastic. The upper portion snaps over into locking engagement with a lower portion 74 provided with a smooth writing surface 76. Ribs 77 are provided on the underside of the lower portion to rigidify the writing surface. A window 72 is provided over the writing surface. The smooth writing surface allows entry of hand-written information onto the strip chart and also assures that the stylus 24 has a smooth surface to act on for each strip chart. It has been found that for transit shipments the ideal recording medium is a pressure sensitive strip chart paper with a pressure stylus 24. The stylus 24 must be sharp to make a fine legible line and as a result, repeated movement of the stylus along the same recording path can scratch a line into the surface below the strip chart. Thus, by making the writing surface part of the disposable dispenser the stylus is uniquely provided with a new writing surface for each shipment.

During manufacture the upper and lower portions of the dispenser are joined at a hinge 78. The lower portion is provided with a container 80 in which is nested a rolled end of a strip chart. To load the dispenser the upper portion is swung away from the lower portion and the rolled end of the strip chart is seated into the container 80. Next the free end of the strip chart is slid along the lower portion. The writing surface of the lower portion is recessed as at 82 to assist in guiding the strip chart to keep it in accurate alignment. Next, the upper portion is snapped over the lower portion, securely holding the strip chart therebetween, but holding the strip chart with only a slight amount of friction so that it may be easily pulled out of the dispenser and wound on the core 38.

The pin 58 is integrally molded into the bottom of the lower portion 74 and fits through an opening 84 to engage the switch 52. The lower portion is also provided with a forward vertical flange 86 and a pair of spaced guide openings 88. The guide openings 88 fit over a pair of guide pins 90 in the base 20 to position and hold the dispenser in the base. Two spaced posts 92 hold the dispenser down in the case. The plastic material of the upper and lower portions 70 and 74 is sufficiently resilient to allow a force fit between the posts 92. To remove the dispenser the user need only lift the dispenser about the pins 88 and move it forward in the case. By pressing through the window to hold the strip chart, the strip chart may then be unwound from the spool by pulling it, using the dispenser as a handle.

While the preferred form of the invention has been illustrated and described, it should be understood that variations will be apparent to one skilled in the art without departing from the principles of the invention. Accordingly, the invention is not to be limited to the specific embodiment described, but only by a literal interpretation of the claims appended hereto.

I claim:

1. A portable strip chart recorder comprising a case having a base and top, mounting means in said case for holding a strip chart, drive means in said case for advancing said strip chart, a battery circuit for powering said drive means, a transducer for sensing an environmental variable and having a stylus engageable with said strip chart, switch means positionable for closing said battery circuit to power the drive means and for opening said circuit to conserve the battery, and means for manually advancing said strip chart and overriding the drive means when initiating use thereof, said mounting means including a disposable chart dispenser removable from said case and having means for accurately positioning the dispenser in said case, said dispenser including a lower portion and an upper portion, a window in said upper portion for exposing a strip chart to said stylus and for manually writing on the strip chart prior to closing the top, a container on said dispenser for holding a rolled end of strip chart and means for guiding the free end of the strip chart between said upper and lower portions, said drive means including a spool operable to be secured to said free end of the strip chart, said dispenser being detachable from said spool as well as said case whereby the dispenser contains only the strip chart and thus is expendable at a minimum cost, said lower portion having a smooth writing surface disposed opposite said window to facilitate writing on said chart and to provide a new writing surface for the stylus, said switch means including a first switch for partially completing said circuit, said lower portion having a switch operator engageable with said first switch for closing said first switch only when the dispenser is in said case whereby removal of said dispenser opens said circuit to conserve the battery.

2. A portable strip chart recorder comprising a case having a base and top, mounting means in said case for holding a strip chart, drive means in said case for advancing said strip chart, a battery circuit for powering said drive means, a transducer for sensing an environmental variable and having a stylus engageable with said strip chart, switch means positionable for closing said battery circuit to power the drive means and for opening said circuit to conserve the battery, and means for manually advancing the strip chart and overriding the drive means when initiating the use thereof, said mounting means including a disposable chart dispenser removable from said case and having means for accurately positioning the dispenser in said case, said switch means including a first switch for partially completing said circuit and a second switch for finally completing said circuit, means on said dispenser for closing said first switch only when said dispenser is in said case, and means on said strip chart manual advancing means for automatically completing said circuit when said dispenser is in said case and said strip chart is manually advanced whereby the circuit is closed by advancing the strip chart and is open both prior to advancement and after the dispenser is removed.

3. A portable strip chart recorder comprising a case having a base and top, mounting means in said case for holding a strip chart, drive means in said case for advancing said strip chart, a battery circuit for powering said drive means, a transducer for sensing an environmental variable and having a stylus engageable with said strip chart, switch means positionable for closing said battery circuit to power the drive means and for opening said circuit to conserve the battery, and means for manually advancing the strip chart and overriding the drive means when initiating use thereof, said switch means including a movable contact and means on said strip chart manual advancing means for actuating said contact to close the battery circuit whereby the circuit is automatically closed during the period the strip chart is being manually advanced, said mounting means including a disposable chart dispenser removable from said case and having means for accurately positioning the dispenser in said case relative to said drive means, said dispenser including a lower portion, an upper portion, a discharge opening, and an enlarged window in said upper portion for exposing the strip chart to said stylus and being large enough for manually writing on the strip chart prior to closing the top, said lower portion having a smooth writing surface disposed opposite said window to facilitate writing on said chart and to provide a new writing surface for the stylus, a container on said dispenser for holding a rolled end of strip chart, and means provided on said upper and lower portions between said window and said discharge opening for guiding the chart between said upper and lower portions and through said discharge opening, said drive including a spool operable to be secured to said free end of the strip chart as it leaves said discharge opening, said dispenser being detachable from said spool as well as said case whereby the dispenser contains only the strip chart and thus is expendable at a minimum cost.

4. A portable strip chart recorder comprising a case having a base and top, mounting means in said case for holding a strip chart, drive means in said case for advancing said strip chart, a battery circuit for powering said drive means, a transducer for sensing an environmental variable and having a stylus engageable with said strip chart, switch means positionable for closing said battery circuit to power the drive means and for opening said circuit to conserve the battery, and means for manually advancing the strip chart and overriding the drive means when initiating use thereof, said switch means including a movable contact, and means on said strip chart manual advancing means for actuating said contact to close said circuit upon the manual advancement of said strip chart when initiating use thereof.

* * * * *